UNITED STATES PATENT OFFICE.

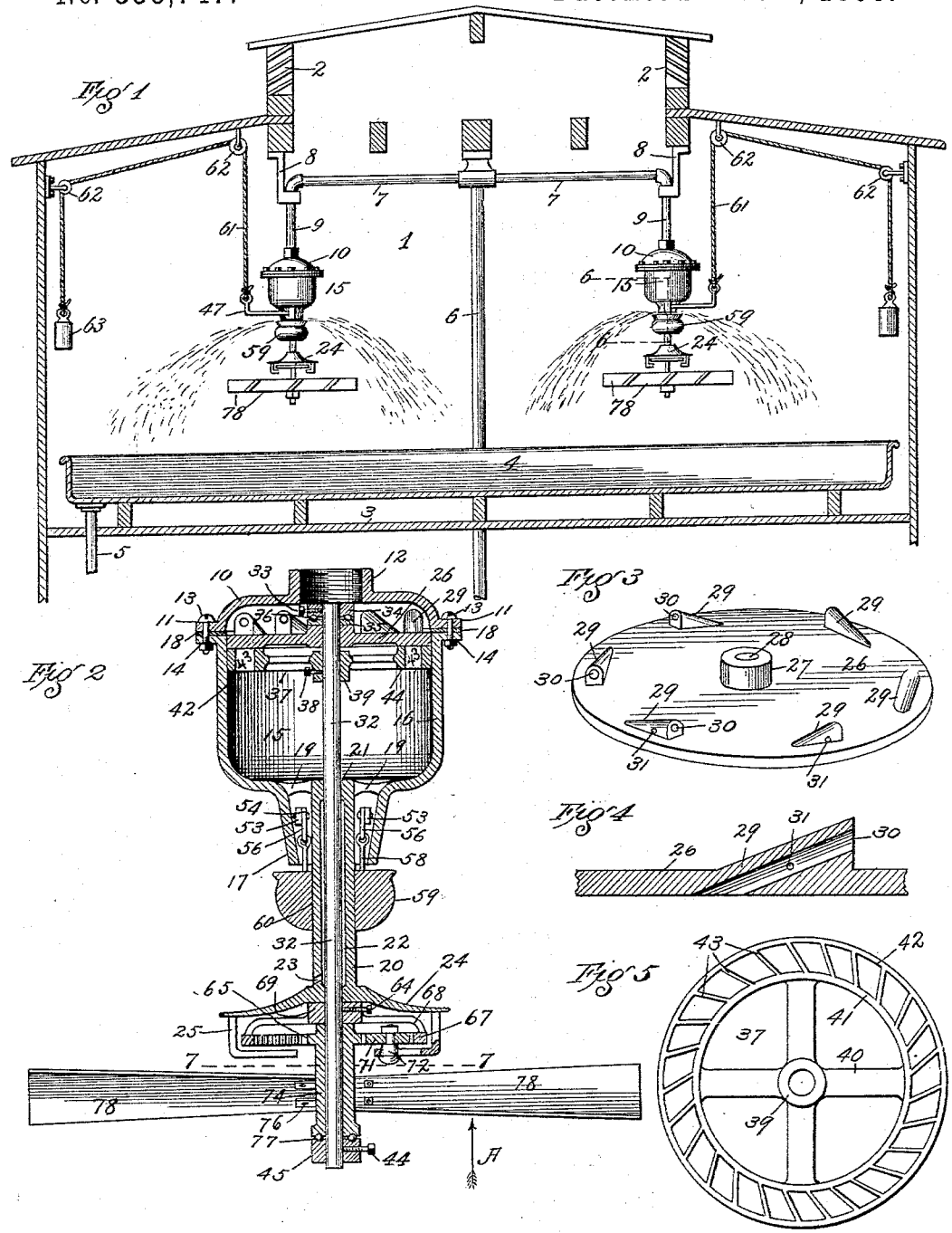

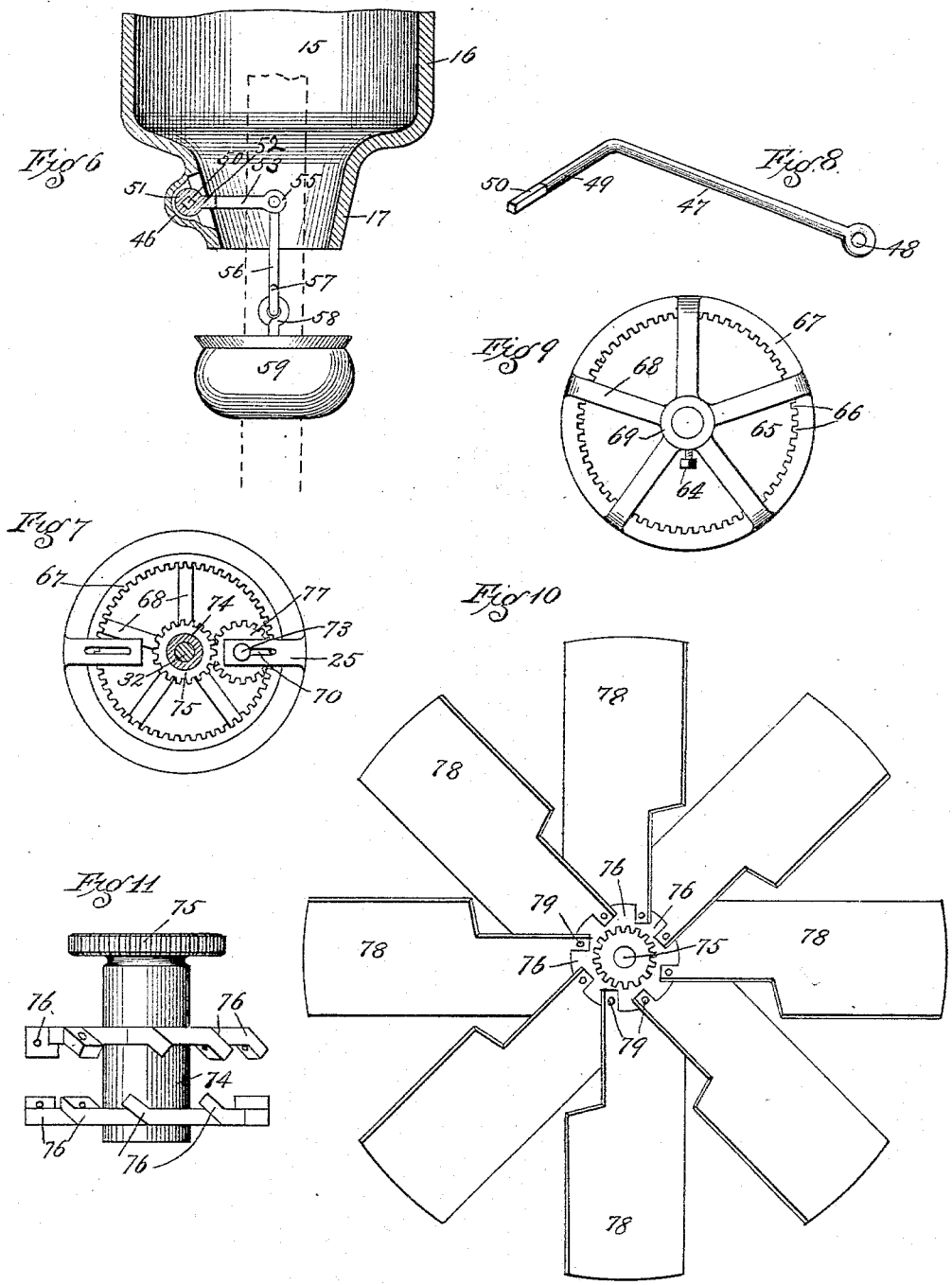

OTTO RITTER, OF ST. LOUIS, MISSOURI.

BEER-COOLING DEVICE.

SPECIFICATION forming part of Letters Patent No. 533,747, dated February 5, 1895.

Application filed July 30, 1894. Serial No. 519,012. (No model.)

*To all whom it may concern:*

Be it known that I, OTTO RITTER, of the city of St. Louis, State of Missouri, have invented certain new and useful Improvements in a Beer-Cooling Device or Apparatus for Cooling and Aerating Liquids, of which the following is a full, clear, and exact description, reference being had to the accompanying drawings, forming a part hereof.

My invention relates to a beer cooling apparatus, the object of my invention being to so construct an apparatus as that when the wort or beer is passed through said apparatus it will operate a fan, which fan by its rotation sprays and cools the beer.

A further object of my invention is to so gear the fan upon the central shaft as that said fan will rotate with greater rapidity than does the shaft.

My improved beer cooling apparatus is adapted to be located in an inclosure which is generally located in the top of brew houses, the beer being forced to said inclosure by a pump, or other suitable means, there to be passed through the apparatus and into the vats or pans adapted to receive it.

My invention consists in a suitable hollow casting adapted to be supported in a position above the beer cooling receptacle, a shaft mounted vertically in said casting, a series of discharge nozzles or apertures located in said casting, a motor or turbine-wheel mounted to receive the beer that is discharged from said nozzles or apertures and to be revolved by the pressure of the beer, and a fan driven by and located below the said motor or turbine wheel in position to receive the beer sprayed above said fan by the movement of said parts.

My invention further consists in certain novel features of construction, combination and arrangement of parts, hereinafter specified and claimed.

Referring to the drawings: Figure 1 is a longitudinal sectional view of the top of a brew house and showing a plurality of my devices located therein in position as required for practical use. Fig. 2 is a vertical sectional view of my complete device. Fig. 3 is a view in perspective of the disk having the inclined apertures therein, and through which the beer passes. Fig. 4 is a sectional view of a portion of the disk more clearly showing one of the inclined openings. Fig. 5 is a top plan view of the wheel having the tangent blade, against which the beer engages in its passage through the device. Fig. 6 is an enlarged sectional view on the line 6—6 of Fig. 1. Fig. 7 is a sectional view on the indicated line 7—7 of Fig. 2, taken in the direction as indicated by the arrow "A." Fig. 8 is a perspective view of a rod I make use of in carrying out my invention. Fig. 9 is a top plan view of a specially formed gear-wheel I employ in my device. Fig. 10 is a top plan view of the fan. Fig. 11 is a side elevation of a specially formed sleeve having thereon flanges, and to which the blades of the fan are secured.

In the construction of the device as shown, 1 designates an inclosure which is generally located at the top of the brew-house, and is provided with the usual openings 2 to allow a free circulation of air through said inclosure to assist in cooling the beer. Upon the floor 3 of this inclosure is located a tank or basin 4, from which passes an outlet pipe 5, which leads to tanks provided for the reception of the cooled beer.

6 indicates a vertical pipe leading to a point immediately above the center of the basin 4. Connected to that portion of the pipe 6 that extends over the basin 4 are the ends of the longitudinal pipes 7, which extend in opposite directions, secured to the roof timbers by the hangers 8, and are there provided with the depending pipe 9.

In Fig. 1 have shown two fans, together with their operating parts. As they are identical in construction and operation, but one will be described.

A cap 10 is provided with an annular flange 11 and a centrally located upwardly extending portion 12, the interior of which is screw-threaded and adapted to be engaged by the lower end of the pipe 9. By means of bolts 13 this cap is secured to an annular flange 14 on the upper end of the funnel-shaped casting 15, said funnel-shaped casting comprising the hollow body portion 16 and the depending discharge spout 17, the same being of a lesser diameter than that of the body portion 16. A suitable packing-ring 18 is interposed between the flanges 11 and 14.

Formed integral with the top of the discharge spout 17 is a series of arms 19, which have rigidly secured to their inner ends the upper end of a sleeve 20, said sleeve 20 extending some distance below the lower end of the discharge spout 17. The vertical bore 21 of this sleeve 20 is enlarged, as indicated by 22, and a drain outlet 23 connects said enlarged bore with the exterior of the sleeve. Rigidly secured to the lower end of the sleeve 20 is a deflector 24, the same being inclined in all directions from the sleeve 20, and provided on its under side with the downwardly and inwardly extending brackets 25.

Rigidly secured to the inside of the upper portion of the body 16 of the funnel-shaped casting is a disk 26, the same being provided with a centrally located bearing 27, said bearing having therein a circular aperture 28. Formed integral with this bearing and extending upwardly from a point near the edge thereof, are inclined lugs or bosses 29, in which are formed inclined bores or apertures 30. Perforations or apertures 31 extend from these bores 30 to the outside of the inclined lugs 29, and are for a purpose that will be hereinafter mentioned.

A vertical shaft 32 passes through the aperture 28 in the bearing 27 and has rigidly secured thereto, by means of a set-screw 33, a collar 34. This collar 34, together with a mating collar 35, and a plurality of spherical bodies 36, constitute an ordinary ball-bearing. Thus it will be seen how the disk 26 sustains the shaft 32.

The wheel 37, about to be described, is positioned immediately beneath the disk 26 and is rigidly mounted upon the shaft 32 by means of a set-screw 38 passing through the hub 39 of said wheel and engaging against the periphery of the shaft 32. This wheel 37 comprises the hub 39, radiating arms or spokes 40, inner rim 41, outer rim 42 and tangent blades 43 connecting the rims 41 and 42. It is the intention that these tangent blades 43 shall move in the path directly beneath the lower ends of the bores 30 through the disk 26.

The shaft 32 extends downwardly through the bearings formed by the bore 21 in the upper and lower ends of the sleeve 20, and has secured to its lower end by means of a set-screw 44, a collar 45. Formed in the wall of the discharge spout 17 is a cup-shaped portion 46.

A link 47, having on one end an eye 48, has its lower end 49 bent at right angles to the main body, the end of said portion 49 being squared as indicated by the numeral 50. The rear end 51 of a yoke 52 is adapted to occupy this cup-shaped portion 46 and to receive the squared end 50 of the rod 47. The arms 53 and 54 of this yoke 52 pass to points on both sides of the sleeve 20 and are there provided with eyes 55 which are adapted to receive the upper ends of the vertically arranged rods 56. The lower ends of these rods 56 are formed into eyes 57 which are engaged by hooks 58 that extend vertically from a hemispherical cut-off block 59, having therein the centrally arranged bore 60, which allows said hemispherical block to readily slide in a vertical direction upon the sleeve 20.

To the eye 48 of the rod 47 is secured the free end of a rope or cable 61, which passing over pulleys 62 secured to the ceiling and wall of the inclosure 1, has secured to its other end a suitable weight 63, this weight 63 being so adjusted as to normally hold the hemispherical block 59 in engagement with the lower end of the discharge spout 17, thereby closing said discharge spout.

Secured to the shaft 32 immediately below the deflector 24 and above the brackets 25, by means of a set-screw 64, is a gear-wheel 65, the teeth 66 of said gear-wheel being upon the inner periphery of the rim 67, the arms or spokes 68 of said wheel being in a plane a slight distance above that of the rim 67. The set-screw 64 passes through the hub 69 of this gear-wheel, the arms or spokes 68 being formed integral with said hub 69.

Formed in the longitudinal portions of the brackets 25 are slots 70. A pinion 71 is adapted to be held in engagement with the teeth 66 of the gear-wheel 65 by means of a headed bolt 72 passing through the center of said pinion, through the slot 70 in one of the brackets 25, and there held by a nut 73.

The hub of the fan comprises the sleeve 74, with the upper end of which is integrally formed a pinion 75, said sleeve also being provided with the outwardly extending inclined flanges 76, there being two series of these flanges 76, one being directly above the other. The lower end of the sleeve 74 is adapted to bear directly upon the series of spherical bodies 77 located upon the collar 45, thus forming a ball-bearing.

When the sleeve 74 is positioned upon the lower end of the shaft 32, the teeth of the pinion 75 will mesh with the teeth of the pinion 71.

Ordinary fan blades 78 formed of sheet metal, or any suitable material, are secured to the inclined flanges 76 by means of rivets or bolts 79. By reason of the flanges 76 being inclined, the blades 78 will necessarily be inclined, thus providing fans of the kind desired. The outer ends of these fan blades 78 may be widened as shown in Fig. 10, though any size and form of blade desired can be used advantageously.

The operation is as follows: The beer, or other liquid, to be cooled is forced upwardly through the pipe 6, outwardly through the pipe 7 and into the chamber formed between the cap 10 and the immovable disk 26. Here it will pass downwardly through the inclined bores in said disk 26 and strike the tangent blades 43 of the wheel 37 with sufficient force to rotate same. This wheel 37 being rigidly fixed to the shaft 32, said shaft will necessarily be rotated. The gear-wheel 65 being rigidly fixed to the lower end of the shaft 32 will in turn be rotated. By reason of the intermediate pinion 71, the pinion 75, upon the sleeve 74 of the fan (said fan carrying the fan-blades 78) will be rotated, thus accomplishing the desired result. By forming the gear-wheel 65 much larger than the pinion 75, it will be seen how said pinion will be driven at a greatly increased speed from that of the gear-wheel 65. Thus it will be seen how the fan is driven at a high rate of speed, thus creating rapid circulation and currents of air. The force of the beer, or other liquid, will overcome the weight 63 and force the hemispherical block 59 downward, thus allowing the escape of the beer from the discharge spout 17. The currents and circulation of air caused by the rapidly rotating fan will spray the discharged beer and cool the same before it reaches the tank or basin 4. The flow of the beer is regulated by means of the weight 63 and hemispherical body 59. A greater pressure or flow of beer through the funnel-shaped casting 15 will necessarily cause the hemispherical block 59 to slide downwardly the required distance for the discharge of the beer. As the pressure or flow of beer recedes, the weight 63 will, by reason of the rope 61, arm 47, yoke 52 and rods 56, draw the hemispherical body 59 to its normal position. By providing the apertures 31 in the disk 26 and on a level with the top surface thereof all of the beer discharged onto said disk can readily pass through the bores 30 and into the funnel-shaped casting 15. By providing the aperture 23 in the enlarged bore 22 of the sleeve 20, any beer that may enter said bore will be immediately discharged.

By this construction all the beer is removed from the device, and all danger of different parts of the device becoming inoperative by reason of freezing of beer remaining in said device entirely precluded.

Thus it will be seen how I have constructed a beer cooling device that possesses superior advantages in point of simplicity, durability and general efficiency.

What I claim is—

1. The combination in a beer-cooling apparatus, of a beer-discharging pipe or nozzle and a suitable motor adapted to be mounted in a position above the beer-cooling receptacle and be revolved by the pressure of the beer issuing from said pipe or nozzle, and a fan driven by and located below the said motor in position to receive the beer sprayed above said fan by the movement of said parts, substantially as set forth.

2. In a beer cooling apparatus, a disk rigidly mounted within the receiving receptacle and provided with a series of inclined lugs or bosses in which are located inclined bores, and perforations connecting said bores with the outside of the inclined lugs.

3. An improved beer-cooling apparatus, comprising a receiving-basin suitably located, pipes leading from the brewing-kettles to a point immediately above said basin, revolving-fans located immediately over this basin, so arranged and constructed as to be revolved by the flow of the beer through a perforated disk and water-wheel, thus cooling the beer as it is sprayed over and above said fan, substantially as specified.

4. An improved beer-cooling apparatus, comprising a pipe leading from brewing kettles to a receiving basin, laterally extending pipes from said main pipe, depending pipes leading into a chamber located above a disk having inclined openings radially-arranged in said disk, said openings circular in cross-section, a revoluble-wheel having inclined blades adapted to receive beer from said openings, and to be revolved by the pressure of the beer, and a fan driven by and located below the wheel in position to receive the beer sprayed above said fan by the movement of said parts, substantially as set forth.

5. In an improved beer-cooling apparatus, a main pipe leading from brewing kettles to a receiving basin, branch pipes leading from said main pipe equal distances over said basin, an outlet pipe leading from said basin, said supply pipes extending horizontally and downwardly and adapted to convey the beer into a chamber above a disk rigidly fixed on a vertical fan-shaft, said disk having radially-arranged inclined openings, the beer passing through said openings and engaging the inclined blades formed within a revoluble-wheel, the shaft projecting downwardly from said wheel, a series of projecting inclined fan-blades secured to the lower part of said shaft, a casting constructed to be vertically reciprocated beneath said chamber, an arm connected to the upper portion of said casting, one end of said arm connected to a rocking-link or shaft, a rope connected to the outer end of said link, and a weight connected to the other end of said rope, all arranged and combined to operate in the manner set forth.

6. In a beer cooling apparatus, the combination of a funnel-shaped casting, a disk rigidly mounted in the upper end of said casting and provided with a series of inclined bores or apertures, a wheel having tangent blades operating upon a vertically positioned shaft and immediately below the disk, a regulating device for controlling the flow of beer through the funnel-shaped casting, a fan carried by the lower end of the vertically positioned shaft and running loosely thereon, and a speed-gear rigidly carried by the vertically positioned shaft and adapted to drive the fan at a greater speed than that of the shaft.

7. In a beer cooling apparatus, the combination of a funnel-shaped casting, a sleeve depending therefrom, a shaft vertically positioned within said sleeve and said funnel-shaped casting, a deflector rigidly fixed to the lower end of the sleeve, a driving wheel provided with tangent-blades near its periphery rigidly mounted near the upper end of the vertical shaft, and a fan operated at a high rate of speed carried by and loosely mounted
5 upon the lower end of the vertical shaft, said speed gearing rigidly fixed to the lower end of the shaft.

In testimony whereof I affix my signature in presence of two witnesses.

OTTO RITTER.

Witnesses:
  E. E. LONGAN,
  JOHN C. HIGDON.